Dec. 13, 1927.

J. T. DICKSON 1,652,661

CONTROL FOR SAND REELS, HOISTS, AND THE LIKE

Filed Oct. 19, 1926

INVENTOR
James T. Dickson,
by J. W. Sheely
ATTORNEY

Patented Dec. 13, 1927.

1,652,661

UNITED STATES PATENT OFFICE.

JAMES T. DICKSON, OF LOS ANGELES, CALIFORNIA.

CONTROL FOR SAND REELS, HOISTS, AND THE LIKE.

Application filed October 19, 1926. Serial No. 142,755.

The present invention relates to the control of sand reels, hoists and the like, and has for its principal object the provision of a more flexible and more easily operated control for such devices.

Sand reels are employed for running bailers, swabs and the like, in oil wells, and while being similar in many respects to usual hoisting equipment, they are required to be run at high cable speeds with comparatively light loads, and in order to be efficient they must be stopped, started and released quickly and easily. It is therefore an object of the present invention to provide a control for such devices to facilitate such efficient control and to provide against too sudden stopping and jerking.

Usual controls of the above mentioned class are provided with a brake and clutch. In bringing the load to a quick stop, such as when a bailer comes to the surface, the brake must be applied while the clutch is being released. Such hoists, reels and the like are driven preferably by a constantly running member, such as by the band wheel shaft of a rig driving one member of the clutch constantly. Therefore, should the brake be applied to stop the cable, without the clutch being simultaneously released, trouble would result, such as parting of the chain. Likewise, if the clutch is released before the brake is properly applied, the load begins to descend immediately and an undue jerk is imparted to the cable when the descent of the load is checked.

For expeditious operation and control of high speed hoisting equipment of this kind, considerable skill is required. The more skillful operators employ carefully coordinated movements in attempt to disengage the clutch while applying the brake, and vice versa, but usual clutches tend to stick and operate differently at different times. Also, most clutches have the peculiarity of not possessing the ability to slip or release rapidly. It frequently happens when the brake is being applied that the clutch does not disengage as easily as it was calculated to do.

I have found that it is desirable to provide a mechanism whereby the brake can be safely applied while the clutch is still raising the load, so that when the clutch is released the brake will immediately catch and hold the load. Or, in other words, it is desirable to be able to retard the hoist shaft with the brake while allowing the clutch to slip, so that the load is brought to rest against the power of the band wheel, which power is being transmitted to the hoist shaft through the clutch. It is therefore an important object of the present invention to provide a control mechanism which tends to overcome the above mentioned objections and disadvantages which are common to present types of controls.

I have illustrated my invention by the accompanying drawings in which I have shown a preferred embodiment thereof.

In the drawings:—

Figure 1:
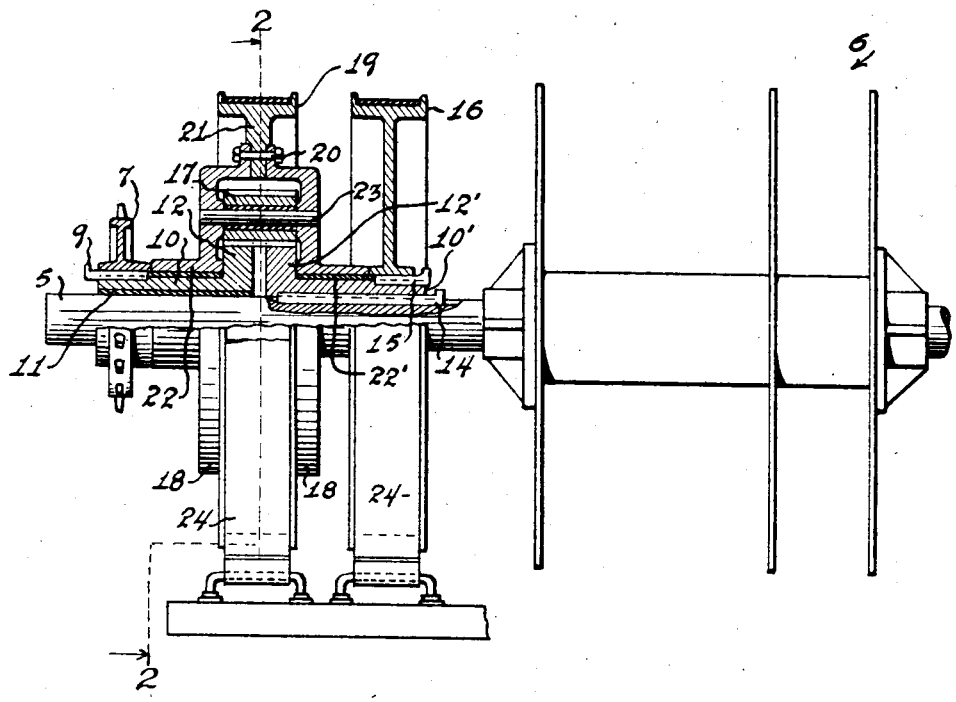
Figure 1 is a view mainly in section of such embodiment.
Figure 2:
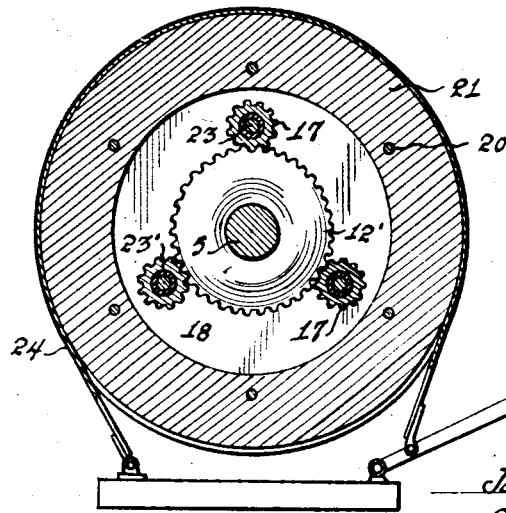
Figure 2 is a view in cross section on a line 2—2 of Fig. 1.

More specifically, 5 indicates a reel shaft to which are secured the usual reels, or hoist drums, such as 6. Long cables, (not shown) are wound upon these drums, as in the case of usual hoists, and it is the object of the control mechanism to provide for properly stopping, starting and otherwise controlling the rotative speed and direction for said shaft and reels. A sprocket wheel 7 is provided, which in the case of standard oil well equipment, is driven by a chain which runs over a corresponding sprocket carried by the band wheel, or bull wheel, of a rig. Such parts are well understood and are therefore not illustrated. For sake of efficiency and quick operation, this sprocket runs continuously. Instead of being fixed to the shaft, said sprocket is keyed, as at 9, to a sleeve 10, which sleeve runs loosely over the shaft and is accordingly provided with a bearing or bushing 11.

Integral with said sleeve there is provided a gear 12 so that the gear is revoluble independently of the shaft 5. Another sleeve 10' and a corresponding gear 12' are provided, but the last mentioned gear and sleeve are secured to the shaft, to revolve therewith, by a key 14. To the sleeve 10', there is keyed, as at 15, a brake drum 16. The sprocket wheel and the gear 12 are therefore revoluble independently of the shaft 5, while the brake drum and the gear 12' revolve only with the shaft 5.

For the purpose of causing the sprocket wheel to drive the shaft 5 at the will of the operator, I provide certain parts which coact with each other to serve as an improved clutch. Said parts consists of, a pinion 17, a pair of housings 18 and a divided brake drum 19. The gears 12 and 12' are of the same diameter and are directly opposed, so that the pinion 17 meshes with ease at all times. Two or more pinions, such as 17, are provided. The pinions and the gears are entirely enclosed by the opposed circular housings. Said housings are held together by bolts 20, and said housings are so drawn together as to hold flanges 21 of the divided brake drum 19. Thus the divided housing and the divided drum 19 are in a single assembly which is independently revoluble around the shaft 5, by reason of each housing section having a sleeve extension 22 revolubly encompassing the corresponding sleeve 10 or 10'; pinion pins 23 passing transversely through the housing to revolubly support the pinions. Said pins, although not shown specifically, are fixed, while the pinions are each provided with a friction reducing bushing so that each pinion is revoluble on the fixed shaft.

Each brake drum 19 and 16, is of course provided with suitable friction means, such as a brake band 24. Brake bands and the like, and means for moving them into frictional engagement with a corresponding drum, are well understood and are therefore not fully illustrated herein. Each brake band is operable independently of the other, so they may be variously manipulated.

The following will enable those skilled in the art to understand the operation of the embodiment illustrated and to apply my invention to various hoisting equipments. The sprocket wheel runs continuously, and ordinarily the brake drum 16 is engaged to hold the reel and shaft from revolving or from being revolved by the sprocket wheel. The gear 12 is driven with the sprocket wheel, but the housing and the divided drum 19 are free to revolve, accordingly, since the pinions are not held in any fixed position, the gear 12' is not driven by the gear 12. To raise a load by the sand reel, the brake band is gradually applied to the drum 19 so that the rotary movement of the housing is resisted. Brake bands, unlike clutch facings, take hold more slowly and allow for slipping. The brake band on drum 19 is further applied until it appears that the sprocket is carrying a high frictional load of the band. Subsequently, and before this load becomes too great, the brake 16 is released. By the time the brake band 16 is fully released the friction of the band on drum 19 is sufficient to hold the housing from revolving. Thus the pinions rotate on fixed axes and act as a means for causing the gear 12 to drive the gear 12' and thus drive the shaft 5. In this manner the load is gradually, or in fact may be very quickly, picked up without allowing the load to descend by reason of the brake being released prematurely. In bringing the load to a quick but proper stop, the brake is gradually applied until it is capable of holding the raised load. Then the band on drum 19 is released, allowing the housing to idle around the shaft so that the shaft 5 is no longer affected by the driving sprocket.

It will be apparent now that my improved mechanism provides for independently or co-ordinately operating both brake bands in such manner that the load is transferred from the brake to the sprocket, or vice versa, quickly but evenly and in a manner to permit of very efficient, rapid and skilful control of any hoisting equipment to which my invention is applied.

I claim:—

1. In combination a shaft, a reel fixed to said shaft, a driven gear keyed to said shaft, a driving gear loose on said shaft, a member revoluble around said gears, a pinion meshing jointly with said gears and carried revolubly in said member, a brake for said member, and a brake for said driven gear.

2. In combination, a shaft to be driven, a driving sleeve fitted revolubly on said shaft, a housing section fitted revolubly on said driving sleeve with one end of said sleeve projecting into said housing section, a driving gear on that end of said sleeve disposed in housing, a driven sleeve co-axial to, and fixed to, said driven shaft, a second housing section similar to the first housing section and fitted revolubly on said driven sleeve, a driven gear carried by said driven sleeve and disposed in said second housing section and adjacent said driving gear, pinions meshing with both of said gears and revolubly carried jointly by said housing sections and enclosed thereby together with said gears, a brake drum carried jointly by said housing sections, and a second brake drum fixed to said driven sleeve.

3. In combination, a shaft to be driven, a driving sleeve fitted revolubly on said shaft, a housing section fitted revolubly on said driving sleeve with one end of said sleeve projecting into said housing section, a driving gear on that end of said sleeve disposed in housing, a driven sleeve co-axial to, and fixed to, said driven shaft, a second housing section similar to the first housing section and fitted revolubly on said driven sleeve, a driven gear carried by said driven sleeve and disposed in said second housing section and adjacent said driving gear, pinions meshing with both of said gears and revolubly carried jointly by said housing sections and enclosed thereby together with said gears, a brake drum carried jointly by said housing sections, and a second brake drum fixed to said driven sleeve; said first named brake drum having a web disposed between said housing sections, and bolts securing said housing sections together and holding said brake drum web between them.

JAMES T. DICKSON.